United States Patent [11] 3,576,586

[72] Inventor Bernd Ross
Arcadia, Calif.
[21] Appl. No. 750,068
[22] Filed Aug. 5, 1968
[45] Patented Apr. 27, 1971
[73] Assignee Bell & Howell Company

[54] VARIABLE AREA INJECTION LUMINESCENT DEVICE
6 Claims, 5 Drawing Figs.

[52] U.S. Cl. 346/108, 179/100.3, 313/108, 317/234
[51] Int. Cl. G01d 9/42, G11b 7/12, H05b 33/16
[50] Field of Search 179/100.3 (Z); 346/107, 108; 313/108 (D); 317/235 (27); 250/211 (J), 217 (SSC); 331/94.5 (CB); 337/7.51

[56] References Cited
UNITED STATES PATENTS
2,994,575 8/1961 Colterjohn 346/74
3,333,135 7/1967 Galgiwaitis 179/100.3UX
3,436,679 4/1969 Fenner 179/100.3UX
3,477,041 11/1969 Steele et al. 332/7.51
FOREIGN PATENTS
1,228,337 11/1966 Germany 313/108

*Primary Examiner*—Bernard Konick
*Assistant Examiner*—Raymond F. Cardillo, Jr.
*Attorney*—Nilsson, Robbins, Wills & Berliner

ABSTRACT: An electroluminescent semiconductor diode having a PN junction extending along an edge thereof and first and second contacts spaced thereon. Forward voltage is applied via the first contact through the PN junction to generate light thereat and the second contact is held at ground potential to limit the spread of light to the vicinity of the first contact. As voltage across the PN junction increases, the light spreads from the first contact to the second contact as a function of such voltage increase. The regions of the semiconductor defining the PN junction can be shaped so that light is generated at a predetermined nonlinear function of the voltage across the PN junction.

INVENTOR
BERND ROSS

BY Nilsson & Robbins
ATTORNEYS

VARIABLE AREA INJECTION LUMINESCENT DEVICE

BACKGROUND OF THE INVENTION

1. Field of the Invention

The field of art to which the invention pertains includes the field of barrier layer devices.

2. Description of the Prior Art

Injection electroluminescence results when a semiconductor PN junction is biased in the forward direction so that electrons are injected into the P side and holes into the N side. These minority carriers radiatively recombine within a diffusion length to emit light at the PN junction. The wavelength of the emitted light corresponds in energy, at most to the forbidden band gap of the material and is generally in the infrared region of the spectrum. Injection electroluminescence has been found in a large variety of semiconductors, such as cadmium sulfide, zinc sulfide, zinc oxide, zinc telluride, zinc selenide, indium arsenide, indium antimonide, indium phosphide, gallium arsenide, gallium phosphide, boron phosphide, boron nitride, aluminum nitride, other group II—VI and III—V compounds, silicon and germanium.

A lasing structure can be provided by cleaving the ends of the semiconductor crystal parallel to each other and perpendicular to the PN junction. In such structures, it is theorized that an electromagnetic wave propagates along the plane of the junction from one cleaved or polished face of the crystal to the other and along its path is amplified by the radiative recombination of injected minority carriers. In turn, these carriers are stimulated by the wave. When the wave reaches the opposite cleaved face it is partly reflected back and then partly reflected again. If the amplitude of the wave at that point equals that of the starting wave, the threshold for lasing has been reached and laser radiation occurs.

Semiconductor electroluminescent devices can be very small, less than 1 mm. in any dimension and they can have effeciencies as high as several percents. Light emitted from the diode radiates in all directions from the PN junction and is emitted from wherever the PN junction is exposed. In this regard, the light is no more useful than light obtained from conventional sources except that the light source in this case can be made very small and the light is spectrally purer. For example, if the electroluminescent diode is used as a light source in a photorecorder, means such as a galvanometer would still have to direct the light beam onto the recorder paper as a function of voltage applied to the galvanometer. It would be very desirable to vary the position of the light beam as a function of voltage applied to the diode, rather than to the galvanometer.

SUMMARY OF THE INVENTION

The present invention represents an important advance in the art in that it provides means for generating light from a diode in such manner that the light varies in area in proportion to the amplitude of current applied to the diode. An electroluminescent diode is provided having a PN junction extending lengthwise along an edge thereof and means are provided for generating light along a predetermined portion of such edge in response to a signal current so that such light spreads lengthwise along the edge as the signal current changes. In particular, the signal is applied as a forward voltage across the PN junction at one point on the device while a limiting voltage is applied along the PN junction at a second point on the device. The limiting voltage is initially of such magnitude as to limit the spread of the emitted light to the vicinity of the spot at which the forward voltage is applied. However, as the signal increases, the effect of the limiting voltage decreases so that the light spot spreads on a line along the PN junction toward the spot at which the limiting voltage is applied. The result is a device that yields a light image whose area is a function of the amplitude of the signal (injection current) applied to the diode.

It is now possible to design a variable area-recording scheme without moving projection parts in the recording station. Thus, in another embodiment of this invention, a photorecorder is provided in which the foregoing variable area electroluminescent diode is utilized to record a current signal on photosensitive paper, without requiring a galvanometer. Light from the diode impinges on the photosensitive paper to yield an image that varies in proportion to the amplitude of the signal applied to the diode.

In still other embodiments, the diode has opposed polished edge portion defining a laser cavity therebetween, with the PN junction extending between such polished portions. By increasing the intensity of the signal current, stimulated rather than spontaneous emission predominates with resultant laser action and attendant spectral narrowing and coherent emission.

If the electroluminescent diode is viewed as a succession of elemental diodes connected in parallel, it will be seen that the length and intensity of the line of light depends upon the current density through each elemental diode area. The current density, in turn, depends upon the resistance in series with each diode element, such resistance being related to the width of the diode structure. Accordingly, by varying the width of the region in which the PN junction is located, a variable response to signal changes is obtained. Thus, in another embodiment of this invention, such region is shaped so that the emitted light is generated as a predetermined nonlinear function of the signal current.

DESCRIPTION OF THE PREFERRED EMBODIMENTS

Figure 1:
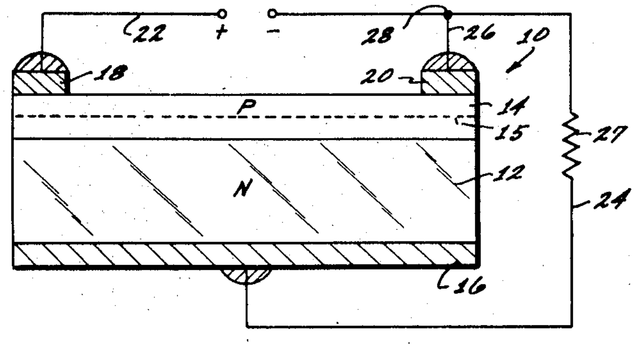
FIG. 1 is a schematic, sectional view of a variable area electroluminescent diode of this invention.
Figure 2:
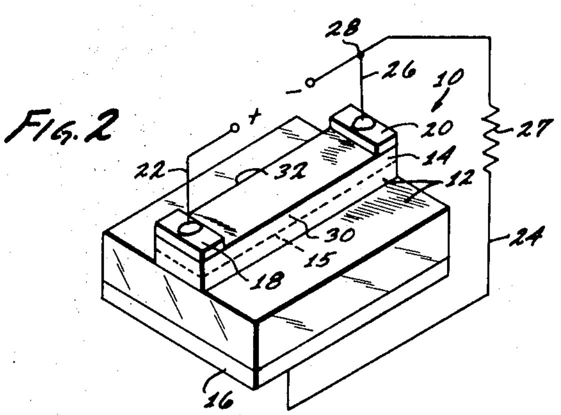
FIG. 2 is a schematic, perspective view of the device of FIG. 1.

Referring to FIGS. 1 and 2, an electroluminescent diode 10 is illustrated. The diode is constructed in accordance with well-known prior art methods and comprises a body 12 of N-type semiconductor material having a region 14 thereon of P-type semiconductor material defining a PN junction 15 therebetween. A metal contact plate 16 abuts the bottom of the N-type body to form a bottom electrode therefor, and metal contacts 18 and 20 abut the P-type region at opposite ends of the device. Electrical leads 22, 24 and 26 are soldered to the left-hand top metal contact 18, the bottom electrode 16 and the right-hand top metal contact 20, respectively. The latter two leads are connected, at 28, so that the right-hand top contact 20 and bottom electrode 16 are connected in parallel and equipotential. Alternatively, a resistance 27 is connected between the right-hand metal contact 20 and bottom electrode 16 to provide a functional relationship as will be described.

A signal current generator (not shown) is connected to the diode with its positive polarity connected to the left-hand top contact 18, via its electrical lead 22, and its negative polarity connected to the bottom electrode 16, via its electrical lead 24. At this point, if the right-hand top contact lead 26 is not connected to the bottom electrode lead 24, but the left-hand contact 18 is coextensive with the entire P-type region, a somewhat traditional electroluminescent diode is obtained and upon the application of a signal current voltage of appropriate magnitude, light is emitted from the PN junction 15. Since under these conditions the entire P-type region 14 is equipotential, the light will be emitted along the entire periphery of the device wherever the PN junction is exposed.

The present invention carries the foregoing construction one step further. It limits the area of forward voltage application and additionally connects the negative polarity of the signal current generator to the right-hand top metal contact 20, via its lead 26 so that it may be equipotential with the bottom electrode 16 (as noted previously). Thus, while a forward voltage is applied to the left-hand top contact 18 (forward current contact), a limiting voltage is applied to the right-hand top contact 20 (limiting contact), restricting the forward current. As a result, any light that is emitted at the PN junction 15 is limited to the vicinity of the forward current contact 18, its spread toward the limiting contact 20 being opposite, in effect, by the voltage applied thereto.

In further explanation of the foregoing phenomenon, it can be seen that when the bottom electrode 16 and limiting contact 20 are equipotential, no light can be emitted from the PN junction immediately beneath the limiting contact 20. However, as one goes from that contact 20 to the forward current contact 18, a difference in potential begins to develop between points along such route and the bottom electrode 16, until at some intermediate point, the difference in potential is great enough so that forward current flowing therethrough is above the amount of current needed for effective light emission. For example, assume that the difference in potential between the signal current generator positive polarity and negative polarity is just sufficient so that the forward current barely exceeds the current required for effective light emission. In such a case, the emitted light would be restricted to the vicinity of the forward current contact 18, since the difference in potential between the bottom electrode 16 and points to the right of the forward current contact 18 would be below the required level, whereas in prior devices the entire PN junction would be emitting light. Now if one were to increase the amplitude of the signal current so that a greater difference of potential exists between the bottom electrode 16 and the forward current contact 18, then a greater than required potential would exist between the bottom electrode 16 and some of the points to the right of the forward current contact 18 so that light is emitted from the portions of the PN junction beneath such points. As one increases the amplitude of the signal current, sufficient potentials are created between the bottom electrode 16 and the more and more points on the P-type region 14 to the right of the forward current contact 18 so that light emission spreads from the PN junction portion below the forward current contact 18 toward the limiting contact 20 (not completely reaching the PN junction portion beneath the limiting contact 20 except for appropriate resistor 27 values). Accordingly, one can apply a signal to the device, as indicated, so that light is emitted and can then vary the area of the emitted light by changing the amplitude of the signal. One therefore obtains a variable area light-emitting device without moving parts, a distinct development in the art.

Diode emitters of the type utilized in the construction of the variable electroluminescent devices of this invention are well known to the art and their composition and methods of fabrication are not a part of this invention. As indicated previously, electroluminescent emission has been observed in a large number of semiconductors, including group IV materials, group III—V compounds and group II—VI compounds. For example, N-type semiconducting material such as GaAsP is degenerately doped by known diffusion techniques with a P-type dopant such as cadmium, and/or zinc. The preparation of such diodes is described in detail in "Gallium Arsenide-Phosphide: Crystal, Diffusion and Laser Properties" by C. J. Nuese, et al., Solid-State Electronics, Volume 9, 735—749 (1966), incorporated herein by reference. In FIG. 7 of that article, the photon energy of the emission peak $GaAs_{1-x}P_x$ junction diodes is given as a function of mole fractions GaP. Photon energy is, of course, related to wavelength by the formula $E_{(ev)}=1.24\times10^4/\lambda(A)$. Accordingly, the composition of the $GaAs_{1-x}P_x$ can be chosen so as to yield an emission energy of desired level. In a typical example, 1 mg. of zinc is diffused into $GaAs_{0.58}P_{0.42}$ under pressure from 10 mg. of As in a 5 cubic centimeter ampul with a diffusion anneal at 925° C. lasting 16 hours and producing a junction depth of 75 microns. This junction is the PN junction 15 noted above in reference to FIG. 1. The contact plate 16 can be gold metal and alloyed with heat to the bottom N-type layer, or the N-type layer can be degenerately doped with an N-type impurity such as arsenic or antimony until a completely conductive layer is obtained on the bottom thereof. In a similar manner, the contacts 18 and 20 can be applied to the top P-type layer. The electrical leads 22, 24 and 26 can then be soldered to the appropriate metal contact. As exemplary of operation, when a bias of about 1.6 volts carrying a forward current of about 100 milliamperes is applied across the forward current contact 18 and bottom electrode 16 light peaking at a wavelength of about 6,800 A is emitted from the PN junction portion immediately below the forward current contact 18. When the forward current is raised to about 500 milliamperes, the light spot spreads until it is about halfway to the limiting contact 20.

Referring to FIG. 2, the electroluminescent diode 10 of FIG. 1 is shown in perspective. In this case, portions of the diode 10 have been cut away so that the PN junction 15 is of uniform width along its extension from the forward current contact 18 to the limiting contact 20. The length and intensity of the line of light depends upon the current density through each elemental diode area. The current, in turn, depends upon the resistance in series with each diode element, i.e., resistance of the material from the forward current contact 18 to the particular point in question. This resistance can be adjusted by varying the thickness of the diffused layer, but for each constructed device such layer is fixed. The resistance can also be adjusted by shaping the resistive network area (i.e., the P-type conductivity layer 14). With the device depicted in FIG. 2, this resistive network area is of uniform width. With appropriate resistance elements, such as 27, the signal current required to generate light can increase in predetermined proportion to the length desired for the light line.

The device depicted to FIG. 2 illustrated another embodiment of this invention. If desired, one can polish opposed faces of the emitting region, e.g., 30 and 32, until they are parallel and define a Fabry-Perot laser cavity therebetween. In such a case, and upon the application of sufficiently high excitation intensities, stimulated, rather than spontaneous emission, predominates and laser action results. With prior semiconductor lasers, it has been theorized that an electromagnetic wave originating at one cleaved or polished face, e.g., 30, and propagating along the plane of the PN junction to the other cleaved or polished face, e.g., 32, is amplified along its path by the radiative recombination of injected minority carriers. In turn, these carriers are stimulated by the wave. When the wave reaches the opposite cleaved face 32, it is partly reflected, travels back, and is then partly reflected again. If the amplitude of the wave then equals that of the starting wave, the threshold for lasing is reached and lased light will be emitted from the PN junction. The previous description with relation to simply electroluminescent radiation is applicable here, except that higher levels of current are required. Thus, for a GaAs device, room temperature lasing action will occur when a forward current of 20 amperes is applied under the bias of 1.5 volts to yield a spot of coherent light of 9,200 A wavelength directly beneath the forward current contact 18. As the current is increased, the lased light spreads on a line along the PN junction toward the limiting contact 20, as above.

Figures 3, 4:
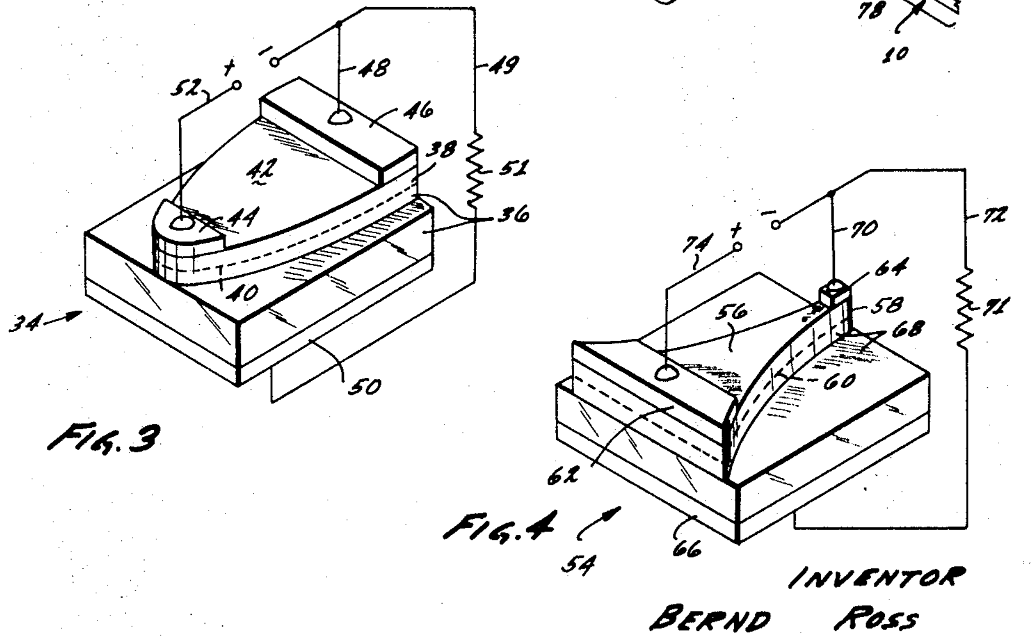
FIG. 3 is a schematic, perspective view of an electroluminescent diode of this invention shaped so as to generate light as a predetermined nonlinear function of applied voltage.
FIG. 4 is a schematic, perspective view of an alternative mathematical function generator operating similar to the diode of FIG. 3.

It was noted that the resistive network area may be shaped and in FIG. 2 a shape having uniform width was shown. The resistive network area may also be shaped in order to provide various predetermined mathematical function. Thus, a mathematical function generator can be provided that integrates light output as a function of voltage by means of a suitably shaped resistive network. Referring to FIG. 3, such a nonlinear shaped resistive area is shown. A semiconductor electroluminescent diode 34 is depicted comprising a layer 36 of N-type semiconductor material having a region 38 of P-type semiconductor material thereon defining a PN junction 40 with the N-type semiconductor material 36. The top surface 42 of the P-type layer 38 constitutes the resistive network area referred to above and is shaped, along with an underlying portion of the N-type material 36, into a parabolic configuration. Shaping can be accomplished by any well-known prior art method; e.g., the parabolic configuration can be coated with acid-resistant polymer and the remainder of the P-type region 38 and corresponding portion of the underlying N-type region can be etched away with acid. A forward current contact 44 can be placed near the focus of the parabolic configuration and a limiting contact 46 can be placed at the opposite end thereof and connected to a lead 48 which in turn is connected through a resistor 50, via a lead 49 in parallel with a bottom electrode 50. A signal current generator has its positive polarity applied, via a lead 52, to the forward current contact and has its negative polarity applied, via leads 48 and 49, to the limiting contact 46 and bottom electrode 50, respectively. Upon application of an appropriate signal current, as previously discussed, across the PN junction 40, a spot of light is emitted from the PN junction immediately below the forward current contact 44. As the amplitude of the signal increases, the light sweeps along the parabolic curve toward the limiting contact 46. Since resistance in series with the elemental diodes decreases as one goes from the forward current contact 44 to the limiting contact 46, the voltage available for light emission increases at a much less rapid rate than with the device of FIG. 2. Accordingly, the rate of sweep of a line of light for a given signal increase is much slower than the rate of sweep obtained with the device of FIG. 2 for the same materials and signal increase rate.

Referring to FIG. 4, a variable area electroluminescent diode 54 is depicted that is also shaped to constitute a mathematical function generator. In this case, the resistive network area 56 (the top surface of the P-type conductivity region 58) and underlying PN junction 60 are shaped to form curves that are asymptotic to each other so that resistance in series of each elemental diode rapidly increases as one goes from the left-hand to the right-hand side of the device. As before, a forward current contact 62 is placed on the high resistance, wide portion of the configuration while a limiting contact 64 is placed on the opposite, narrow portion of the configuration. The negative polarity of a signal current generator is connected to the limiting contact 64 and to the bottom electrode 66 of the device, abutting the N-type conductivity layer 68, through a resistor 71, via electrical leads 70 and 72, respectively. The positive polarity of the signal current generator is connected via an electrical lead 74 to the forward current contact 62. In operation, application of a signal current to the device results in the generation of a light spot from the portion of the PN junction 60 immediately below the forward current contact 62. Upon increase in the amplitude of the signal current, the light spot spreads toward the limiting contact 64. In contrast to results obtained with the configuration of FIGS. 2 and 3, as the signal current amplitude is increased the rate of sweep of the light spot increases at a faster rate, reflecting the increase in resistance in series with each elemental diode.

Figure 5:
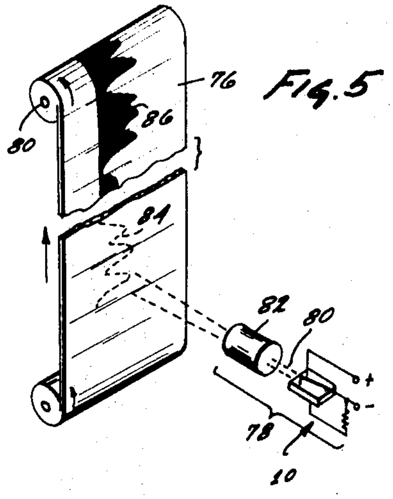
FIG. 5 is a schematic view illustrating the operation of a photorecorder of this invention.

The devices of this invention enable the generation of a light image whose area is in predetermined proportion to the amplitude of the signal applied to the diode, without requiring moving parts but only the variation of an electrical signal. The devices can be used as solid-state meter indicators which give the magnitude of a variable signal current in terms of length of a luminescent line. They can also be used as variable area recording devices that are able to follow very high frequencies, speed being limited only by the RC constant of the device. In this regard, the devices are particularly suitable for use in photorecorders. Referring to FIG. 5, such use is illustrated. A sheet of photosensitive paper 76 is moved through a recording station 78. At the recording station 78 light 80 from an electroluminescent diode 10, such as depicted in FIGS. 1 and 2, is condensed by an optical system, shown figuratively at 82, so as to impinge upon the photosensitive paper 76 to form a latent image 84 thereon. The light 80 from the electroluminescent diode 10 has its greatest intensity in the plane of the PN junction and varies in area in response to a control signal applied to the forward current contact lead 22 and forward current-limiting contact lead 26, as previously described. This results in a corresponding variation in the width of the latent image 84 formed in the photosensitive paper 76. The photosensitive paper continues to move into a developing zone (not shown) where the latent image 84 is developed by any of many known techniques, e.g., by latent image intensification, or by wet development methods, to yield a developed image 86 therefrom. The paper then moves onto a takeup reel 80. The developed image 86 has peaks and valleys corresponding to increases and decreases, respectively, of the signal amplitude.

It will be understood that the foregoing structures are merely exemplary and that variations may be practiced. For example, in each of the foregoing devices the resistive network area may be a diffused N-type conductivity region in a body of P-type conductivity; or epitaxially grown regions may be utilized rather than diffused regions; or ion implantation techniques may be utilized to obtain the PN junction, etc.

I claim:

1. A semiconductor device displaying variable area luminescence, comprising:
- an electroluminescent semiconductor diode comprising first and second regions of opposite conductivity defining a PN junction extending along an edge of the diode and spaced from the outer surface of said first region a distance having substantial continuity along a substantial extent of said first region;
- forward current means for passing current in a forward direction through said PN junction comprising first contact means disposed on a portion only of said first region extent; and
- forward current-limiting means for applying voltage along said PN junction, comprising second contact means spaced from said first contact means on said first region and third contact means disposed on said second region, whereby light generated at said PN junction spreads laterally across said extent upon an increase in voltage across said PN junction.

2. The device of claim 1 including opposed polished edge portions of said diode defining a laser cavity therebetween, said PN junction extending between said portions.

3. The device of claim 1 wherein said second and third contact means are equipotential.

4. A photorecorder, comprising:
- means generating a signal current to be recorded;
- a recording station;
- means for moving photosensitive paper through said recording station; and
- means at said recording station for emitting light to impinge on said photosensitive paper, comprising an electroluminescent diode of claim 1 responsive to said signal current so that said light spreads lengthwise along said edge as signal current voltage changes.

5. The device of claim 1 wherein said first and second contacts are disposed entirely within said first region.

6. The device of claim 5 wherein said first region is shaped to generate light as a predetermined nonlinear function of voltage applied across said PN junction.